July 16, 1968        R. T. McBRIDE        3,392,705
COMPARTMENTED ELECTRODE FOR ELECTRICAL DISCHARGE PROCESS
Filed March 14, 1966
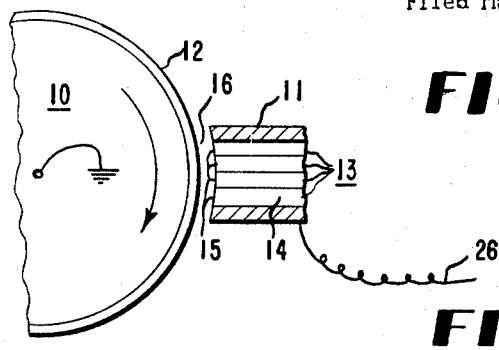
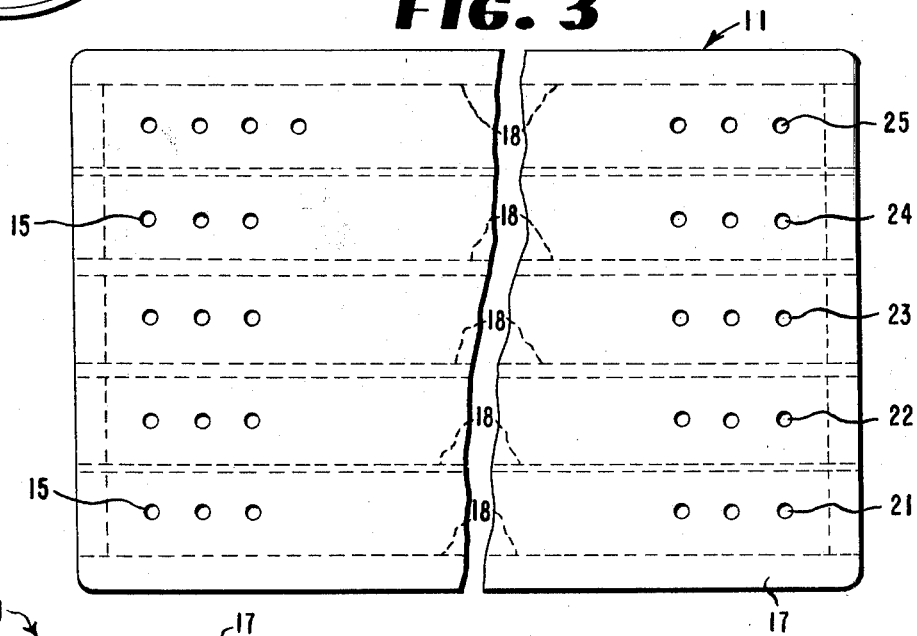
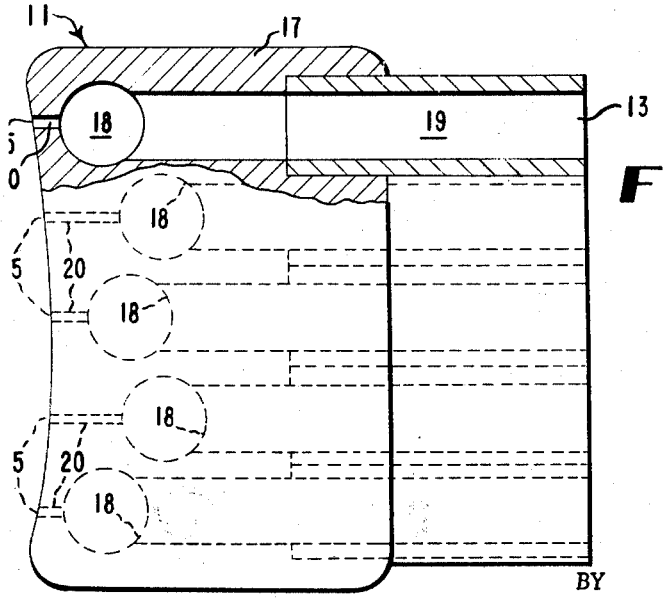
INVENTOR
RICHARD THOMAS McBRIDE
BY Claude L. Beaudoin
ATTORNEY

United States Patent Office 3,392,705
Patented July 16, 1968

3,392,705
COMPARTMENTED ELECTRODE FOR ELECTRICAL DISCHARGE PROCESS
Richard Thomas McBride, Buffalo, N.Y., assignor to E. I. du Pont de Nemours and Company, Wilmington, Del., a corporation of Delaware
Filed Mar. 14, 1966, Ser. No. 534,172
10 Claims. (Cl. 118—630)

ABSTRACT OF THE DISCLOSURE

An electrode device for the electrical discharge treatment of polypropylene is presented, said device having separate flow passages in the body thereof for conducting different fluid materials and discharging said materials adjacent the surface of the polypropylene film being treated.

---

The present invention relates to the surface treatment of organic polymeric materials and, more particularly, is directed to a novel electrode device and apparatus for the electrical discharge treatment of shaped structures of organic thermoplastic polymeric material.

The electrical discharge treatment of organic thermoplastic polymeric structures such as, for example, subjecting the surface of polyethylene film to the action of an electrical discharge, is a now well-known method for rendering the surfaces of such structures adherable to a wide variety of materials as, for example, printing inks, adhesives and coating compositions. In practice, such treatment may be performed by passing a sheet or film of organic thermoplastic polymeric material at a suitable rate such as between about 10 and 300 feet per minute over and in contact with a grounded metal drum while the surface of the sheet or film away from the drum passes under and in close proximity to an electrode that is connected to a source of high frequency alternating potential and which is spaced, for example, between about 0.010 and 0.025 inch, from the film surface. It also is known to conduct the above-described electrical discharge treatment while directing a gas or vapor into the spacing, hereinafter called treating zone, between the charged treating electrode and the surface of the polymeric film to be treated. During the latter treatment, the gas or vapor may be discharged into the treating zone from either a discharge orifice in a hollow treating electrode which also functions as a conduit for the gas or from a separate tube such as a sparger. One major drawback of the foregoing electrical discharge treating devices is their limitation to introducing no more than one gaseous material into the treating zone. For example, a particularly serious problem arises when it is desired to introduce a plurality of gaseous materials into the treating zone, especially gaseous materials which may interact with each other. In the latter case it is necessary to introduce each gaseous material into the treating zone before admixing it with any other gaseous material, since the initial mixing of the gaseous material must take place in the treating zone so that the desired treatment of the shaped polymeric structure passing between the electrodes is successfully effected. Accordingly, it is the principal object of the present invention to provide a new and improved device and apparatus for the electrical discharge treatment of shaped polymeric structures.

The nature and advantages of the invention will be more clearly understood by the following description and the several views illustrated in the accompanying drawings wherein like reference characters refer to the same parts throughout the several views and in which:

FIGURE 1 is a view of the general arrangement of the apparatus of the invention;

FIGURE 2 is a cross-sectional view of a side elevation of the electrode structure of the invention;

FIGURE 3 is a front plan view of the electrode structure shown in FIGURE 2.

The electrode device and electrical discharge treating apparatus herein disclosed in illustration of the invention includes a set of spaced electrodes consisting of a rotatably mounted drum or cylinder 10 of electrically conductive material that is electrically grounded and at least one electrode 11 disposed adjacent thereto and spaced from the surface thereof a suitable distance permitting the passage therebetween of a film structure 12. Drum or cylinder 10 may be conveniently provided with suitable inlet and outlet ports for circulating a fluid medium therethrough for regulating the temperature of its surface. A suitable spacing of electrode 11 from the surface of film 12 is one ranging between about 0.15 inch and .25 inch. Each electrode 11 is constructed of electrically conducting material, preferably metal such as brass, copper, aluminum or alloy compositions thereof, and is connected electrically to a suitable power source (not shown) adapted to supply either an alternating current or a pulsating direct current of the required magnitude at the required voltage and frequency. Electrode 11 is provided with a plurality of separate inlet ports 13 each adapted to be suitably connected to a source (not shown) of either the same or different gaseous material. Each inlet port 13 communicates by means of an internal passage or conduit 14 with an outlet port 15 and gaseous material entering into the electrode 11 by way of inlet ports 13 is directed therethrough by means of internal passages 14 and issues therefrom through outlet ports 15 into treating zone 16. In operation, polymeric film structure 12 is advanced over rotatable cylinder 10 at a controlled speed and the surface thereof away from cylinder 10 passes under electrode 11 and through treating zone 16 wherein the electrical discharge treatment takes place. In practice, the apparatus may be operated with a buffer or dielectric cover on the rotating roll in order to reduce arcing between the stationary electrode and the electrically grounded rotating roll.

The electrode device of the invention is shown more specifically in FIGURES 2 and 3 wherein the electrode 11 is shown as comprising a body portion 17 having a plurality of internal chambers 18 extending substantially the entire length thereof. Each internal chamber 18 is in communication with an inlet port 13 by means of an internal passage or conduit 19 and an outlet port 15 by means of internal passage or conduit 20. The foregoing construction of the electrode 11 permits the following flow path of gaseous material therethrough: entry of gaseous material thereinto through inlet ports 13; flow of the gaseous material from inlet ports 13 into internal chambers 18 by way of internal passages 19; and flow of the gaseous material from internal chambers 18 to outlet ports 15 by way of internal passages 20. The gaseous material issues from each outlet port of the electrode device directly into the treating zone 16. The electrode structure depicted especially in FIGURE 2 may conveniently be provided with a water jacket adapted for circulating a fluid medium therethrough for regulating the temperature of the electrode.

In carrying out the surface treatment of polymeric structures according to the present invention the power source for the electrical discharge between the electrodes may be a motor generator, a spark gap oscillator or similar device. For a spark gap oscillator the current supplied to the electrode structure may be up to about 5.5 RMS (root mean square) amperes, and for optimum satisfactory results the current is preferably between about 0.3 and about 3.5 amperes (RMS). Frequencies from 350 cycles per second up to 500,000 cycles per second and above can be used.

The potential difference maintained between the electrodes may vary from low voltages in the order of about 1000 volts up to peak pulsating voltages of about 100,000 volts and higher. In general, the voltage level is preferably maintained between 2000 and about 3000 volts.

The power supplied to the electrodes may, under the operating parameters above specified, preferably range between about 10 and about 100 watts per lineal inch of electrode length, based upon treating electrode 11. The electrical discharge employed in the present invention is characterized by an average energy level below about 15 electron volts, and thus is not to be confused with either intermediate or high energy irradiation.

The space between the surface of a polymeric film structure passing through treating zone 16 and the face of electrode 11 may range between about 0.015 inch and 0.25 inch. When treating polypropylene film, the space between the polymeric film and electrode 11 is preferably between about 0.025 inch and about 0.060 inch. Of course, selection of the proper space depends upon a number of variables such as the nature of the polymeric material, the power supplied to the electrodes, the dimension of the treating electrode, and the time of exposure of the polymeric film to the action of the electrical discharge.

The time of exposure of the polymeric material to the electrical discharge treatment is only that which is necessary for obtaining satisfactory treatment, and may vary from as low as one second or even less to as long as one minute and even more. The major consideration regarding the selection of exposure time is economic, consistent with obtaining satisfactory treatment of the polymeric material.

A unique feature of the electrode device 11 above described resides in its means and capability for simultaneously introducing separate and different gaseous materials into the treating zone 16 from each of the outlet ports thereof that are connected with the separate internal chambers 18 therein. In this manner, it is possible simultaneously to direct into the treating zone various gaseous materials which are highly reactive each with the other without admixing and reacting the gaseous materials beforehand, that is, the admixing and the reaction of the gaseous materials is confined to the treating zone. Furthermore, separate gaseous materials may be introduced into reaction zone 16 sequentially from the different outlet ports in electrode 11, so that the polymeric structure in passing through treating zone 16 is exposed sequentially to different gaseous materials issuing from rows 21, 22, 23, 24 and 25 of outlet ports 15 in electrode 11.

The principle and practice of the present invention will now be illustrated by the following examples, but it is not intended that the invention be limited thereto since modifications in technique and operation will be apparent to anyone skilled in the art.

The test samples prepared in the following examples were evaluated in accordance with the following testing procedures.

Heat seal strength is measured by cutting a piece of the film test sample of 4 inches by 10 inches, with the grain of the film running in the long or machine direction, into two pieces each of 4 inches by 5 inches. The two test pieces are placed in superposed relation so that opposing surfaces thereof are in contact. The superimposed films are then sealed together at each end at right angles to the grain of the film by means of a ¾ inch wide sealing bar that is heated to a temperature of 140° C. and contacts the film ends at 15 p.s.i. pressure for a dwell time of 1 second. The sealed test samples are then cut in half at right angles to the grain of the film, and the two resulting pieces are each cut along their centerline and parallel to the grain of the film to provide 1½ inch wide strips. The resulting four sets of strips are tested for heat seal strength by securing the free ends thereof in a Suter testing machine and pulling the test samples apart. The highest force, expressed in grams per inch of film sample width, required to pull the strips apart is taken as a measure of the heat seal bond strength.

Example 1

Biaxially oriented polypropylene film of one mil thickness was subjected to electrical discharge treatment in an apparatus as shown in FIGURE 1 utilizing a treating electrode as depicted in FIGURES 2 and 3, by passing the polypropylene film through the treating zone while directing into the treating zone vinyl acetate admixed with a carrier gas consisting of nitrogen which issued from the outlet ports of the treating electrode under the following operating conditions: the electrodes were powered by a power amplifier with push-pull oscillator operating at a frequency of 10,000 cycles per second, at a voltage of about 5000 and a current of about 0.1 ampere delivering approximately 300 watts of power to the 12-inch electrodes spaced .025 inch apart; the strip of film was drawn between the electrodes a total of five passes at a speed of 6 feet per minute; the back-up roll or drum temperature was held at about 35° C.; and the flow rate of nitrogen/vinyl acetate was approximately 0.5 cubic feet per minute.

Samples of the treated polypropylene film when heat sealed together at 130° C. and 15 p.s.i. pressure and a dwell time of ¼ second exhibited a heat seal strength of 50 grams per inch, based upon the width of the sample.

Biaxially oriented polypropylene film was treated in accordance with the above procedure except that a stream of nitrogen gas was caused to issue at the same flow rate from the first row of outlet ports near the edge of the treating electrode whereat the polypropylene film entered the treating zone. Samples of the treated polypropylene film when heat sealed together under the same conditions exhibited a heat seal strength of 200 grams per inch.

Example 2

Following the procedure described in Example 1, a one mil thick film of polypropylene was subjected to electrical discharge treatment while directing into the treating zone a separate stream of water vapor and a separate stream of silicon tetrachloride each issuing from separate outlet ports in the treating electrode. A continuous layer of silicon dioxide was deposited on and adhered to the surface of the polypropylene film.

The above procedure was repeated utilizing polyethylene terephthalate film, resulting in a continuous layer of silicon dioxide being deposited on and adherent to the surface of the polyethylene terephthalate film.

In direct contrast, feeding or conducting the water vapor together with the silicon tetrachloride in the same tube or conduit results in a reaction of the gaseous materials in the conduit and deposition of the silicon dioxide reaction product on the walls of the conduit with substantially no deposition thereof on the surface of the polymeric film.

Example 3

Following the procedure described in Example 1, a one mil thick film of polypropylene was subjected to electrical discharge treatment while directing into the treating zone the following gaseous materials from a treating electrode having five rows of outlet ports as depicted in FIGURE 3:

(a) central or middle row—a mixture of oxygen and water vapor;
(b) each row adjacent the central row—a mixture of oxygen and ethyl ortho silicate vapor;
(c) each outer row—nitrogen, thereby providing a nitrogen gas "blanket" substantially surrounding the reactive gaseous mixtures issuing therein between. A continuous impervious layer of silica was deposited on and adhered to the surface of the polypropylene film.

In direct contrast, without the nitrogen feed from the outer rows of outlet ports of the treating electrode, the mixture of reactive gaseous materials issuing from the other rows of outlet ports ignites and no impervious layer of silica deposits on the surface of the polymeric film.

Example 4

Following the general procedure described in Example 1, a 1.0 mil thick film of a copolymer of tetrafluoroethylene and hexafluoropropylene is subjected to electrical discharge teratment while directing into the treating zone a separate stream of diethylene triamine and glycidyl methacrylate, each being carried in nitrogen gas and issuing from separate outlet ports in the treating electrode at a flow rate of about 4 cubic feet per minute. The resulting treated film is laminated to bright copper foil at 290° C. under a pressure of 10 p.s.i. The resulting laminate shows a peel bond strength of 5000 grams per inch of film width on a Suter tester at a draw rate of 12 inches per minute and at a peel angle of 180°.

In contrast, when the diethylene triamine and glycidyl methacrylate are introduced together through the same tube the two materials interact and plug up the tube in a short period of time, so that sustained film treatment is not realized.

What is claimed is:

1. In an apparatus for the electrical discharge treatment of polymeric film structures to render at least one surface thereof adherent comprising an electrically grounded rotatably mounted cylinder adapted to convey the film; electrode means adapted for connection to a source of pulsating electrical power and spaced from said cylinder for the passage of said film structure therebetween, the improvement wherein said electrode means comprises a body portion and means in said body comprising a plurality of internal chambers aligned lengthwise adjacent one surface thereof adapted for conducting a fluid material therethrough and for discharging said fluid material through discharge openings in said surface of said electrode adjacent said cylinder.

2. The apparatus of claim 1 wherein said means in said body portion include at least one internal chamber extending substantially the entire length of said electrode each in association with an inlet port adapted to receive a fluid material and first conduit means therebetween, and each in further association with at least one discharge port in the face of said electrode and second conduit means therebetween whereby fluid material adapted to be introduced into said inlet port flows via said first conduit means into said internal chamber and thence therefrom via said second conduit means to be discharged through said discharge port.

3. In an apparatus for the electrical discharge treatment of polymeric film structures to render the surfaces thereof adherent comprising an electrically grounded rotatably mounted cylinder adapted to convey the film; electrode means adapted for connection to a source of pulsating electrical power and spaced from said cylinder for the passage of said film therebetween, the improvement wherein said electrode means comprises a body portion; at least one internal chamber in said body portion each in communication with separate inlet means adapted for connection to a source of fluid material, and a plurality of conduits extending from said internal chamber each terminating in an opening at the face of said electrode adjacent said cylinder whereby fluid material adapted to be introduced into each of said inlet means flows into the internal chamber in communication therewith and thence therefrom through said openings at the face of said electrode and into the space between said cylinder and said electrode.

4. The apparatus of claim 3 wherein each internal chamber in said electrode is aligned lengthwise thereof and the conduits extending therefrom are aligned in spaced horizontal parallel planes to provide spaced rows of openings at the face of said electrode.

5. The apparatus of claim 4 wherein said rows of openings are equally spaced.

6. An article of manufacture for the electrical discharge treatment of polymeric film structures comprising an electrode adapted for connection to an electrical power source, said electrode having a body portion and means in said body comprising a plurality of internal chambers aligned lengthwise adjacent one surface thereof adapted for conducting a fluid material therethrough and for discharging said fluid material through discharge openings in said surface of said electrode, wherein said means include at least one internal chamber extending substantially the entire length of said electrode each in association with an inlet port adapted to receive a fluid material and first conduit means therebetween, and each in further association with at least one discharge port in the face of said electrode and second conduit means therebetween whereby fluid material adapted to be introduced into said inlet port flows via said first conduit means into said internal chamber and thence therefrom via said second conduit means to be discharged through said discharge port.

7. An article of manufacture comprising an electrode adapted for connection to an electrical power source and for the electrical discharge treatment of shaped articles of polymeric material, said electrode having a body portion, a plurality of internal chambers in said body portion each in communication with separate inlet means adapted for connection to a source of fluid material, and a plurality of conduits extending from said internal chamber each terminating in an opening at the face of said electrode whereby fluid material adapted to be introduced into each of said inlet means flows into the internal chamber in communication therewith and thence therefrom through said openings at the face of said electrode.

8. The article of manufacture of claim 7 wherein each internal chamber is aligned lengthwise of the electrode and the conduits extending therefrom are aligned in spaced horizontal parallel planes thereby to provide spaced rows of openings at the face of said electrode.

9. The article of manufacture of claim 8 wherein said rows of openings are equally spaced.

10. An article of manufacture for the electrical discharge treatment of polymeric film structures comprising an electrode adapted for connection to an electrical power source having a body, a plurality of internal chambers separated and spaced from each other adjacent one surface of said body, said internal chambers extending lengthwise of said body and each in communication with a plurality of discharge openings in said surface, said discharge openings aligned in rows substantially equally spaced from each other, including a plurality of separate conduit means between each internal chamber and separate inlet means adapted for connection to a source of fluid material whereby different fluid materials adapted to be introduced into said separate inlet means flow into separate internal chambers and thence therefrom through separate rows of said discharge openings for admixing externally of said electrode.

References Cited

UNITED STATES PATENTS

| | | | |
|---|---|---|---|
| 2,418,533 | 4/1947 | Walker | 239—422 |
| 2,925,312 | 2/1960 | Hollman | 346—75 XR |
| 3,093,309 | 6/1963 | Watanabe | 239—15 |
| 3,117,029 | 1/1964 | Hines | 118—621 |
| 3,263,649 | 8/1966 | Heyl et al. | |

CHARLES A. WILLMUTH, *Primary Examiner.*

PETER FELDMAN, *Examiner.*